(12) United States Patent
Fukuda et al.

(10) Patent No.: US 7,481,058 B2
(45) Date of Patent: Jan. 27, 2009

(54) HIGH TEMPERATURE STEAM VALVE AND STEAM TURBINE PLANT

(75) Inventors: Masafumi Fukuda, Saitama (JP); Hideo Hosaka, Kawasaki (JP); Tsutomu Ooishi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 398 days.

(21) Appl. No.: 11/220,984

(22) Filed: Sep. 8, 2005

(65) Prior Publication Data
US 2006/0048513 A1    Mar. 9, 2006

(30) Foreign Application Priority Data
Sep. 8, 2004    (JP)    ............................. 2004-260587

(51) Int. Cl.
*F01K 13/00*    (2006.01)
(52) U.S. Cl. .......................................... 60/645; 60/670
(58) Field of Classification Search .................. 60/645, 60/670
See application file for complete search history.

(56) References Cited

U.S. PATENT DOCUMENTS 2,815,645 A * 12/1957 Downs ........................ 415/112
5,329,779 A * 7/1994 Lozano D. et al. .............. 62/63
7,028,994 B2 * 4/2006 Sherikar ....................... 261/62

FOREIGN PATENT DOCUMENTS

| DE | 2 006 667 | 2/1970 |
|---|---|---|
| GB | 580259 | 9/1946 |
| JP | 57-145879 U | 9/1982 |
| JP | 61-014276 U | 1/1986 |
| JP | 7-247806 A | 9/1995 |
| JP | 8-093407 A | 4/1996 |
| JP | 2004-019784 A | 1/2004 |

OTHER PUBLICATIONS

Dubbel "Taschenbuch für den Maschinenbau", 19th Edition, Springer-Verlag Berlin, Heidelberg, New York, ISBN 3-540-62467-8, pp. 10-11, 1997.

* cited by examiner

*Primary Examiner*—Hoang M Nguyen
(74) *Attorney, Agent, or Firm*—Foley & Lardner LLP

(57) ABSTRACT

A high temperature steam valve has a valve casing including a main steam inlet, a main steam outlet and a valve chest. The high temperature steam valve also has a valve seat positioned in the valve chest, a valve element facing the valve seat, and a valve rod slidably penetrating the valve casing to drive the valve element. A cooling steam hole is provided to surround a valve-rod penetrating portion of the valve casing. Cooling steam can be poured into the cooling steam hole from outside through a cooling steam inlet hole and steam having finished heat exchange can be exhausted from a cooling steam outlet hole into the valve chest. The sliding portion between the valve rod provided in the valve-rod penetrating portion of the valve casing and bush is cooled to prevent oxidized scale from depositing on the sliding portion.

6 Claims, 5 Drawing Sheets

HIGH TEMPERATURE STEAM VALVE AND STEAM TURBINE PLANT

CROSS-REFERENCE TO RELATED APPLICATIONS

This application is based upon and claims the benefit of priority from the prior Japanese Patent Application No. 2004-260587, filed on Sep. 8, 2004; the entire content of which is incorporated herein by reference.

BACKGROUND OF THE INVENTION

The present invention is generally related to a high temperature steam valve, and more particularly to a high temperature steam valve employing a cooling mechanism to cool valve constituent elements. The present invention is also related to a steam turbine plant having a high temperature steam valve.

Recently, it is required that steam turbines of thermal electric power plants be more effective in the light of the environmental problems, so that the steam temperature tends to be raised higher. The steam condition now adopted widely is of about 169 kg/cm$^2$ and 566 degrees Celsius, or of about 246 kg/cm$^2$ and 566 degrees Celsius as shown in Japanese Patent Application Publication Hei 7-247806, the disclosure of which is hereby incorporated by reference in its entirety. The highest steam condition is currently 610 degrees Celsius. The reason why these steam conditions are adopted is mainly that materials used for the parts of the steam valves provided to control the steam flow of the steam turbine are restricted on their cost.

As is well known, the steam valve is so constructed that a valve element located opposite to a valve seat in a valve casing can be driven from the outside through a valve rod. This valve rod is supported slidably with a bush in the valve-rod penetrating portion of the valve casing. Some gap is provided between the bush and the valve rod to allow sliding. In the steam turbine unit employing the currently highest steam condition of the steam temperature of 610 degrees Celsius, heat resistant alloyed steel such as 12-Cr steel for the valve casing, nitride steel for the bush and 12-Cr steel for the valve rod are adopted as the materials constituting each member of the steam valve.

Aiming at higher efficiency is a recent trend, and thereby the steam temperature tends to be raised. Therefore, over the current highest steam temperature of 610 degrees Celsius, adoption of a steam temperature higher than 650 degrees Celsius or even 700 degrees Celsius is studied. Although raising the steam temperature is welcome for improving the thermal efficiency of the steam turbine system, it is very severe for the constituent materials of the steam valve. That is to say, the valve rod gets creep deformation, and oxidized scale which inhibits smooth sliding may deposit on the sliding portion between the valve rod and the bush, and moreover may stick the sliding portion between the valve rod and the bush with a high temperature steam existence.

Accordingly, in a conventional high temperature steam valve, a hole is bored inside the valve rod to let cooling steam flow through to cool the valve rod (e.g. Japanese Utility Model Application Publication Sho 57-145879, the disclosure of which is hereby incorporated by reference in its entirety). In another conventional valve, a valve lid of the valve casing is divided into an upper lid and an inner lid to let cooling steam flow between the upper lid and the inner lid to cool the flange of the casing, and an anti-oxidized layer is provided on the sliding portion between the valve rod and the bush to prevent oxidized scale from depositing (e.g. Japanese Utility Model Application Publication Sho 61-14276 and Japanese Patent Application Publication Hei 8-93407, the disclosures of which are hereby incorporated by reference in their entirety). Furthermore, in a butterfly valve adjusting the opening of passage by rotation of the disc-like valve element, the technology, in which a cylindrical jacket is additionally provided with a space on the outer periphery of the valve shaft cylinder, which is penetrated by one end of the valve rod, is known (e.g. Japanese Patent Application Publication 2004-19784, the disclosure of which is hereby incorporated by reference in its entirety). The valve shaft cylinder is a cylindrical portion accommodating the shaft seal parts such as a gland packing or an elastic cushion material. Cooling medium is supplied to the annularly formed space from the outside.

However, in the technology described in the above-mentioned Japanese Utility Model Application Publication Sho 57-145879, only the valve rod can be cooled, and cooling the sliding portion between the valve rod and the bush is not taken into consideration. Consequently, it is insufficient for the measure to prevent oxidized scale from depositing on the sliding portion. On the other hand, the technologies described in Japanese Utility Model Application Publication Sho 61-14276 and Japanese Patent Application Publication Hei 8-93407 can cool the bolts binding the flange of the valve casing and the valve lid, but cannot cool the sliding portion between the valve rod and the bush as in Japanese Utility Model Application Publication Sho 57-145879. As a result, the technologies described in Japanese Utility Model Application Publication Sho 61-14276 and Japanese Patent Application Publication Hei 8-93407 cannot prevent oxidized scale from depositing at a higher temperature steam even if anti-oxidized layers are provided.

Furthermore, because the technology described in Japanese Patent Application Publication 2004-19784 has the structure cooling the shaft seal part rather than the bearing member rotatably supporting the valve rod, heat is transferred from the valve inside to the bearing member i.e. the valve rod sliding portion via the valve rod, and thereby the rod sliding portion cannot be cooled sufficiently. In consequence, the technology described in Japanese Patent Application Publication 2004-19784 also is not sufficient for the measure to prevent oxidized scale from depositing on the valve rod sliding portion which supports rotation of the valve rod.

As mentioned above, the technologies described in the above-mentioned documents will increase abrasion quantity of the valve sliding portion because oxidized scale deposits on the valve rod sliding portion. As a result, the valve rod and others are obliged to be replaced because the sliding gap between the bush and the valve rod cannot be appropriately maintained for a long time.

BRIEF SUMMARY OF THE INVENTION

The present invention has been invented in view of the shortcomings of the conventional technologies described above. An object of the present invention is to provide a high temperature steam valve that can appropriately maintain the sliding gap between the valve rod and the bush for a long time by preventing or suppressing deposition of oxide scale upon cooling appropriately the sliding portion between the valve rod and the bush disposed at the valve-rod penetrating portion of the valve casing. Another object of the present invention is to provide a steam turbine plant employing such a high temperature steam valve.

According to an aspect of the present invention, there is provided a high temperature steam valve comprising: a valve casing having a main steam inlet, a main steam outlet and a valve chest located therein; a valve seat positioned in the valve chest; a valve element facing the valve seat; and a valve rod slidably penetrating the valve casing to drive the valve element. A cooling steam passage is provided in such a manner as to surround a valve-rod penetrating portion of the valve casing, cooling steam being fed from outside into the cooling steam passage, and the cooling steam being exhausted toward the valve rod in the valve chest through the cooling steam passage.

According to another aspect of the present invention, there is provided a steam turbine plant comprising: a steam turbine; a boiler to feed steam to the steam turbine through a steam line; a steam condenser to condensate steam from the turbine; a feed water pump to feed water from the condenser to the boiler; and a high temperature steam valve disposed on the steam line. The valve includes: a valve casing having a main steam inlet, a main steam outlet and a valve chest located therein; a valve seat positioned in the valve chest; a valve element facing the valve seat; and a valve rod slidably penetrating the valve casing to drive the valve element. A cooling steam passage is provided in such a manner as to surround a valve-rod penetrating portion of the valve casing, cooling steam being fed from outside into the cooling steam passage, and the cooling steam being exhausted toward the valve rod in the valve chest through the cooling steam passage.

BRIEF DESCRIPTION OF THE DRAWINGS

The above and other features and advantages of present invention will become apparent from the discussion herein below of specific, illustrative embodiments thereof presented in conjunction with the accompanying drawings, in which.

DETAILED DESCRIPTION OF THE INVENTION

Figure 1:
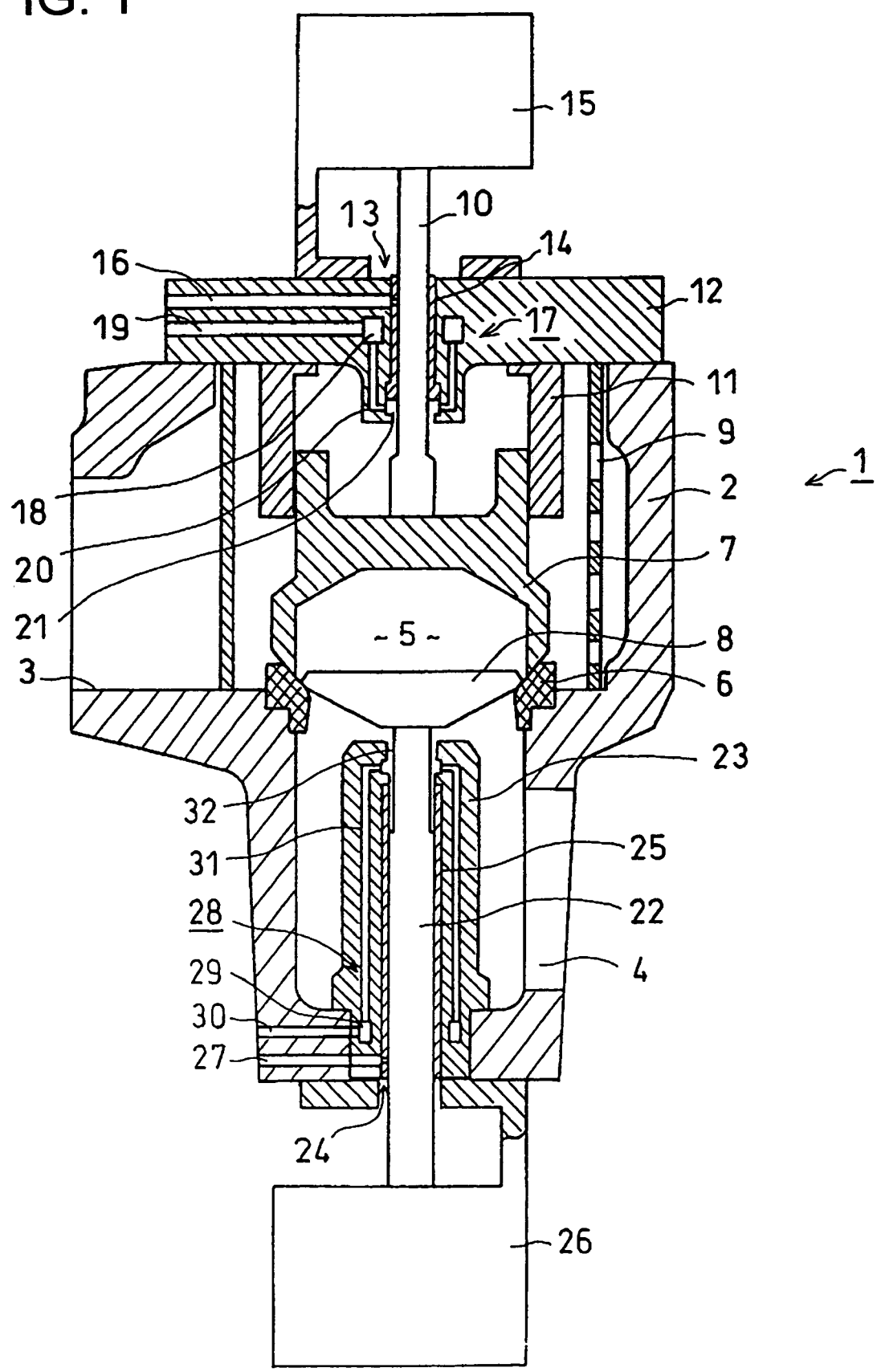
FIG. 1 is a vertical cross sectional view showing a first embodiment of a high temperature steam valve according to the present invention.

Referring to the drawings, embodiments of the present invention will be explained hereinafter.

First Embodiment

FIG. 1 is a vertical cross sectional view of the embodiment in which the present invention is applied to the composite-type reheat high temperature steam valve.

In FIG. 1, the fundamental structure of the composite-type reheat high temperature steam valve will be explained first. Numeral "1" represents the entire composite-type reheat high temperature steam valve. Numeral "2" represents the valve casing where a main steam inlet portion 3 on the left side as shown in the figure and a main steam outlet portion 4 on the opposite right bottom as shown in the figure are provided. A valve seat 6 is placed in a valve chest 5 formed between the main steam inlet portion 3 and the main steam outlet portion 4. A first valve element 7 and a second valve element 8 are driven to rise or descend toward the valve seat 6 from the bottom or the top of the figure. Numeral "9" represents a cylindrical strainer for eliminating dusts in the main steam.

The first valve element 7 has a nearly H-shaped vertical cross section, and its peripheral surface is cylindrical. The first valve element 7 is fixed to the bottom end of a valve rod 10 to the top surface thereof in the figure and is constructed so as to be guided slidably at the peripheral surface thereof along the inner periphery of a guide portion 11. The guide portion 11 is secured to the inner surface of a valve lid 12 of the valve casing 2, i.e. the valve chest 5 side, coaxially with a bush 14. The middle portion of the valve rod 10 is slidably supported by the bush 14 fitted to a valve-rod penetrating portion 13 formed at the center of the valve lid 12 of the valve casing 2. The top end of the valve rod 10 is connected with a first actuator 15 provided on the valve lid 12. The first actuator 15 controls the rate of flow of the main steam by raising or lowering the first valve element 7 with the first valve rod 10 in accordance with a command from the outside.

In the valve lid 12, steam vent holes 16 to evacuate steam leaking through the gap of the sliding portion between the bush 14 and the first valve rod 10 are provided in the radial direction. The number of steam vent holes 16 can be arbitrarily selected, although only one hole 16 is shown in FIG. 1. Furthermore, the valve lid 12 is provided with a cooling steam passage 17 to cool the bush 14 and the valve rod 10. The cooling steam passage 17 includes: a cooling steam manifold 18 provided annularly so as to surround the bush 14; a cooling steam inlet hole 19 supplying the cooling steam to the cooling steam manifold 18; a plurality of cooling steam holes 20 provided in the axial direction of the bush 14 branching off from the cooling steam manifold 18; and a cooling steam exhausting hole 21 communicating the cooling steam holes 20 with the valve chest 5.

On the other hand, the second valve element 8 is secured to the top end of a second valve rod 22 as shown in the figure. The middle portion of the second valve rod 22 is slidably supported by a bush 25 which is fitted to a valve-rod penetrating portion 24 formed at the center of a cylindrical guide portion 23 of the valve casing 2. The bottom end portion of the second valve rod 22 is connected with a second actuator 26 provided on the bottom portion of the valve casing 2.

In the guide portion 23, steam vent holes 27 to evacuate steam leaking through the gap of the sliding portion between the bush 25 and the second valve rod 22 are provided in the radial direction. The number of the steam vent holes 27 can be arbitrarily selected, although only one hole 27 is shown in FIG. 1. In addition, the guide portion 23 is provided with a cooling steam passage 28 to cool the bush 25 and the valve rod 22. The cooling steam passage 28 includes: a cooling steam manifold 29 provided annularly so as to surround the bush 25; a cooling steam inlet hole 30 supplying the cooling steam to the cooling steam manifold 29; a plurality of cooling steam holes 31 provided in axial direction of the bush 25 branching from the cooling steam manifold 29; and a cooling steam exhausting hole 32 communicating the steam, which has exchanged heat through the cooling steam holes 31 with the valve chest 5. The second actuator 26 controls shut-off or run-off of the steam by raising or lowering the second valve element 8 with the second valve rod 22 in accordance with a command from the outside.

In the composite-type reheat high temperature steam valve described above, because the end surfaces of the first valve element 7 and the second valve element 8 come into contact with the valve seat 6 when the valves are completely shut, flow of the main steam at 610 degrees Celsius or higher flowing in the valve chest 5 in the valve casing 2 from the main steam inlet 3 of the valve casing 2 is shut off at the contact portions of the first valve element 7 and the second valve element 8 with the valve seat 6, so that it cannot flow through the main steam outlet 4.

From the close position described above, stop-valve function becomes "open state" upon moving the second valve element 8 upward by means of the second valve rod 22. Furthermore, upon moving the first valve element 7 upward by means of the first valve rod 10, regulation-valve function becomes "open state", so that the main steam is exhausted from the main steam outlet 4 via the gap formed between the first valve element 7, the second valve element 8 and the valve seat 6.

On one hand, at the top portion of the valve casing 2, the cooling steam having a temperature lower than 610 degrees Celsius is supplied to the annular cooling steam manifold 18 from the cooling steam inlet hole 19 provided in the valve lid 12 of the valve casing 2. The cooling steam splits from the cooling steam manifold 18 to the cooling steam holes 20 distributed circumferentially so as to surround the bush 14, and thereby it cools the bush 14 and the valve rod 10 almost uniformly in the circumferential direction through the valve lid 12. The cooling steam, which has exchanged heat with the valve lid 12, is exhausted toward the valve rod 10 inside the valve chest 5 via the cooling steam outlet hole 21. The valve rod 10 is directly cooled by the exhausted cooling steam. Thereafter, the cooling steam is mixed with the main steam injected from the main steam inlet 3, and finally exhausted from the main steam outlet 4 through the gap between the valve elements 7 and 8 and the valve seat 6.

Similarly, at the bottom portion of the valve casing 2, the cooling steam is supplied to the annular cooling steam manifold 29 from the cooling steam inlet hole 30 provided over the bottom portion of the valve casing 2 and the cylindrical guide portion 23. The cooling steam splits from the cooling steam manifold 29 to the cooling steam holes 31 distributed circumferentially so as to surround the bush 25, and thereby it cools the bush 25 and the valve rod 22 almost uniformly in the circumferential direction through the guide portion 23.

Then, the cooling steam, which has exchanged heat with the guide portion 23, is exhausted toward the valve rod 22 inside the valve chest 5 via the cooling steam outlet hole 32. The valve rod 22 is directly cooled by the exhausted cooling steam. Thereafter, the cooling steam is mixed with the main steam having passed through the gap between the valve elements 7 and 8 and the valve seat 6, and finally exhausted from the main steam outlet 4.

Thus, the cooling steam is mixed with the main steam and exhausted through the composite-type reheat high temperature steam valve 1, and finally fed to the steam turbine. However, because the quantity of the cooling steam is slight compared to the quantity of the main steam, it does not affect the steam fed to the steam turbine.

As mentioned above, according to this embodiment, the valve-rod penetrating portion is effectively cooled to an appropriate temperature by pouring the cooling steam having a temperature lower than 610 degrees Celsius into the cooling steam inlet holes 19 and 30, the cooling steam manifolds 18 and 29, and the cooling steam holes 20 and 31, which are provided in the valve lid 12 of the valve casing 2 and the guide portion 23. Furthermore, the valve rods 10 and 22 in the valve chest 5 are directly cooled by the cooling steam exhausted in the valve chest 5 through the cooling steam outlet holes 21 and 32, so that the quantity of heat reaching the sliding portion can be reduced.

As a result, the sliding portion between the bush 14 and the valve rod 10, and the sliding portion between the bush 25 and the valve rod 22 can be maintained at a temperature lower than 610 degrees Celsius. In consequence, because oxidized scale is prevented from depositing on the sliding portions, utilization for a long time can be realized even if conventional materials such as nitrided material and the like are used for the sliding portions of the valve rods 10 and 22 and the bush 14 and 25.

Second Embodiment

Figure 2:
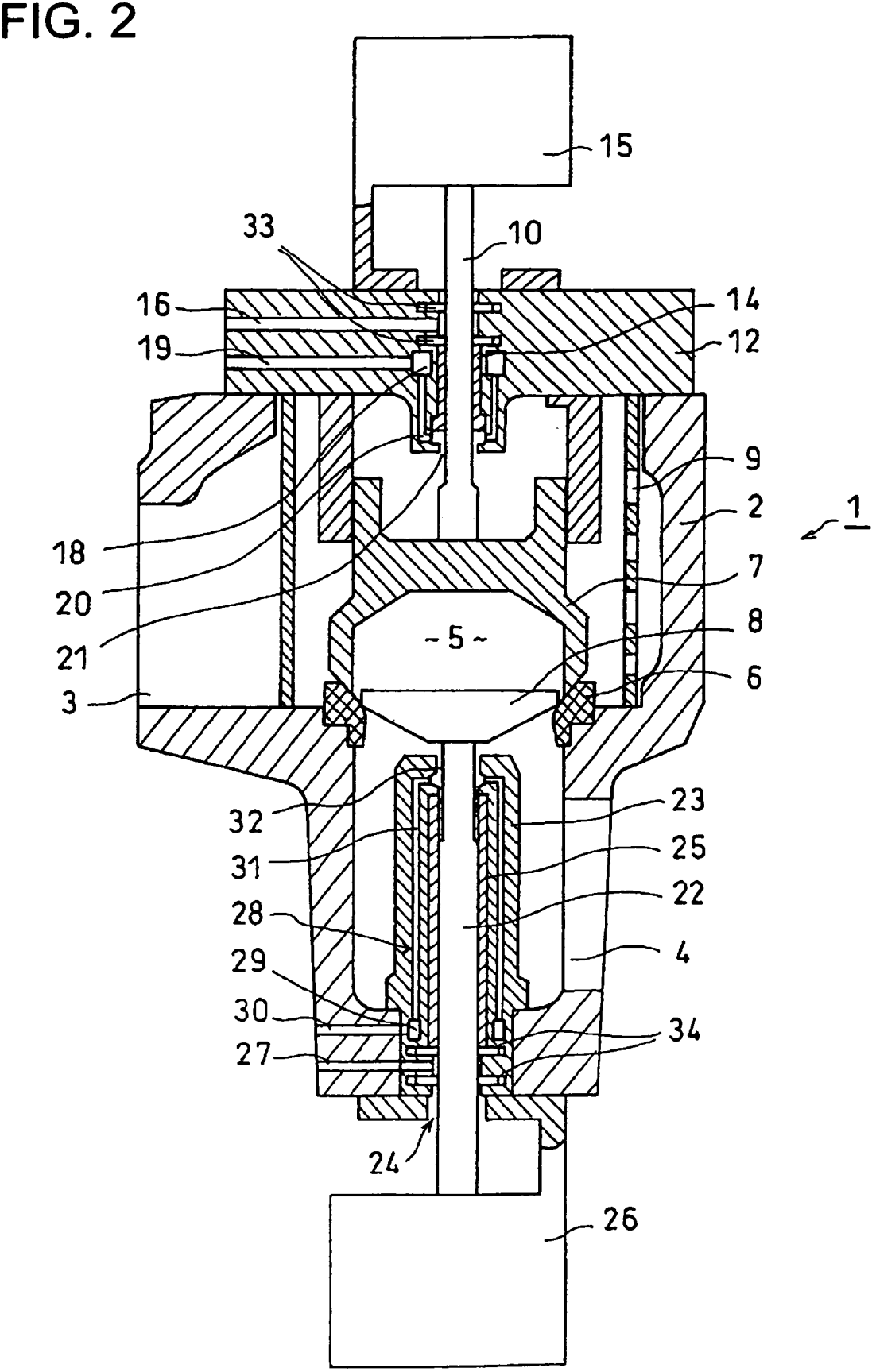
FIG. 2 is a vertical cross sectional view showing a second embodiment of a high temperature steam valve according to the present invention.
Figure 4:
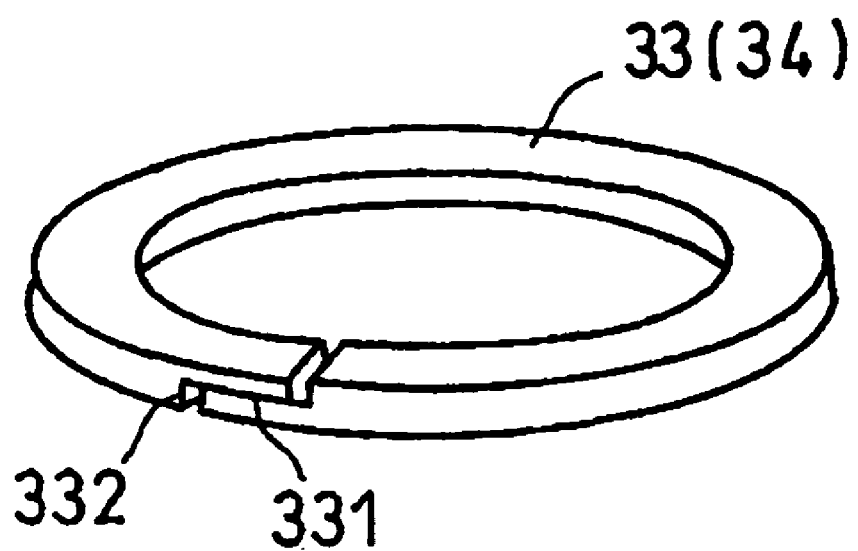
FIG. 4 is a perspective view of a piston ring in the second and the third embodiments.
Figure 5:
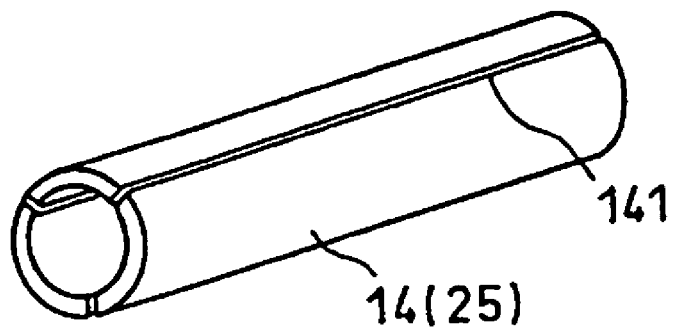
FIG. 5 is a perspective view of a split-type bush in the second and the third embodiments.

The second embodiment of the present invention is now explained referring to FIGS. 2, 4 and 5. This embodiment is also applied, like the first embodiment, to the composite-type reheat high temperature steam valve, so that each part corresponding to the FIG. 1 is denoted by the same numeral and explanation thereof will be appropriately omitted.

In FIG. 2, the main aspect of the second embodiment is that two piston rings 33 and two piston rings 34 are positioned. The openings of the steam vent holes 16 and 27 facing the peripheries of the valve rods 10 and 22, respectively, are positioned between the piston rings 33 and between the piston rings 34, respectively. The bushes 14, 25 are split into plural pieces. The other structures are the same as FIG. 1 mentioned above.

In the case of the second embodiment, the bush 14 does not fully penetrate the valve lid 12 but is mounted up to approximately the middle portion of the valve lid 12 in the thickness direction thereof from the inside of the valve. The gap between the valve rod 10 and the through-hole of the valve lid 12 positioned outside the piston ring 33 is set to be slightly larger than that in the case of the first embodiment shown in FIG. 1. A pair of annular grooves are provided in the valve lid 12 so as to interpose the opening of the steam vent hole 16, which faces the outer periphery of the valve rod 10. The piston rings 33 are mounted in the grooves so that the valve rod 10 can penetrate the piston rings 33. Thereby, steam can hardly escape through the gap between the valve rod 10 and the through-hole of the valve lid 12. The piston ring 33 is formed by circularly bending a piece of rod having a cross-sectional shape of a rectangle. Two step portions are directed in reverse direction to each other on both ends of the piece of the rod, as shown in FIG. 4. These step portions of the both ends are superimposed together, and a gap 332 is provided at the side of the superimposed portion 331 in order to provide spring effect.

The bottom end portion of the bush 25 is mounted up to a length short of the steam vent hole 27, in contrast to the bush 25 of the first embodiment which fully penetrates the guide portion 23. Moreover, the gap between the valve rod 22 penetrating the guide portion 23 and the through-hole of the guide portion 23 is set to be a little larger than that in the case of FIG. 1. Annular grooves are provided in the valve casing 2 so as to interpose the opening of the steam vent hole 27, which faces the outer periphery of the valve rod 22. The piston rings 34 are mounted in the grooves so that the valve rod 22 can penetrate the piston rings 34. Thereby, steam can hardly escape through the gap between the valve rod 22 and the through-hole of the guide portion 23. The piston rings 34 are formed like the piston rings 33.

According to the second embodiment, the gap between the bush 14 and the valve rod 10, and the gap between the bush 25 and the valve rod 22 become larger, so that the rods can slide smoothly. Though the cooling steam flowed from the cooling steam holes 20 and 31 is prone to leak in the direction of the steam vent holes 16 and 27, respectively due to the enlarged gaps, the piston rings 33 and 34 prevent the flow and can stop leakage. The piston rings 33 and 34 have spring effect owing to the superimposed portion 331 and the gap 332. Thus, leakage can be stopped because the gaps between the valve rods 10 and 22 and the piston rings 33 and 34 can be minimized even if the valve rods 10, 22 are expanded or shrunk by the heat.

The bushes 14 and 25 have slits 141 extending axially, as shown in FIG. 5. Because of this structure, any galling or fixation does not take place even if the bushes 14 and 25 have thermal deformation or the gaps become narrow due to a temperature difference generated between the bushes 14 and 25 and the valve rods 10 and 22. In FIG. 5, each of the bushes 14 and 25 is split into three pieces arranged circumferentially with three slits 141, but the number of the slits 141 may be arbitrarily selected.

Thus, the composite-type reheat high temperature steam valve of the second embodiment can be used for a long time, exerting high sliding ability and high leakage preventing function, and furthermore, can prevent galling or fixation caused by thermal deformation due to cooling.

Third Embodiment

Figure 3:
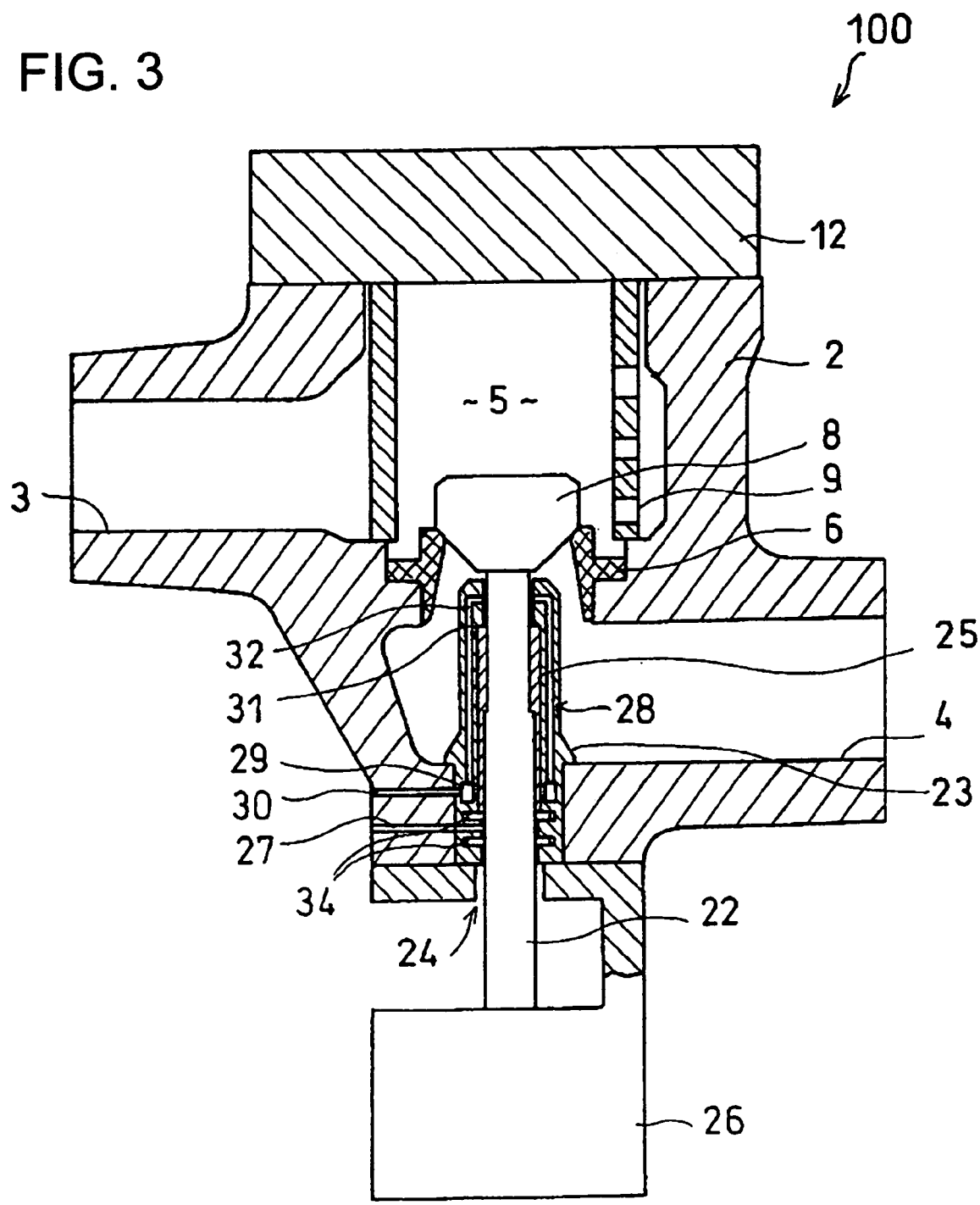
FIG. 3 is a vertical cross sectional view showing the third embodiment of a high temperature steam valve according to the present invention.

Referring to FIGS. 3, 4 and 5, the third embodiment of the present invention is now explained. This embodiment shows an example applied to a main steam stop valve. In FIG. 3, the main steam stop valve 100 of the third embodiment has one valve element, so that the valve-rod penetrating portion 13 shown in FIG. 1 is not provided in the valve lid 12. Only the valve-rod penetrating portion 24 is provided at the bottom of the valve casing 2. The valve casing 2 of this embodiment is provided with the main steam inlet portion 3 on the left side of the figure and the main steam outlet portion 4 at the opposite bottom portion thereof on the right side of the figure. The valve seat 6 and the valve element 8 are located in the valve chest 5 formed between the main steam inlet portion 3 and the main steam outlet portion 4. The valve element is driven from the bottom side of the figure toward the valve seat 6 so that it can touch and detach the valve seat 6. Movement of the valve element 8 toward or away from the valve seat 6 controls shut-off and run-off of the main steam.

In the third embodiment, the valve rod 22 slidably penetrates the cylindrical bush 25 like the case of the second embodiment. The top end of the valve rod 22 is connected with the valve element 8, and the bottom end of the valve rod 22 is connected with the actuator 26. The actuator 26 controls shut-off and run-off of the main steam by moving up and down the valve element 8 through the valve rod 22 in accordance with a command from the outside.

The cooling mechanism of the valve-rod penetrating portion and the steam leakage preventing mechanism of this embodiment are substantially the same as the case of the second embodiment.

The high temperature main steam stop valve of the third embodiment can also be used for a long time, exerting high sliding ability and high leakage preventing function, and furthermore can prevent galling or fixation that may be caused by thermal deformation due to cooling.

In order to improve slidability, the gap between the bush 25 and the valve rod 22 is set to be slightly larger than the conventional case, and the piston rings 34 for preventing leakage are disposed in front of and behind the steam vent hole to prevent increment of leakage of the cooling steam caused by widening the gap. Thereby, it can be used for a long time, exerting high slidability and high leakage preventing function. Furthermore, it can prevent galling or fixation caused by thermal deformation due to cooling upon adopting the mechanism in which the bush 25 is split vertically.

Other Embodiments

The embodiments mentioned above are the composite type reheat steam valve or the main steam stop valve, but the present invention is not restricted thereto. It can also be applied to other high temperature steam valves such as a main steam control valve, a reheat steam stop valve and a reheat steam control valve.

Figure 6:
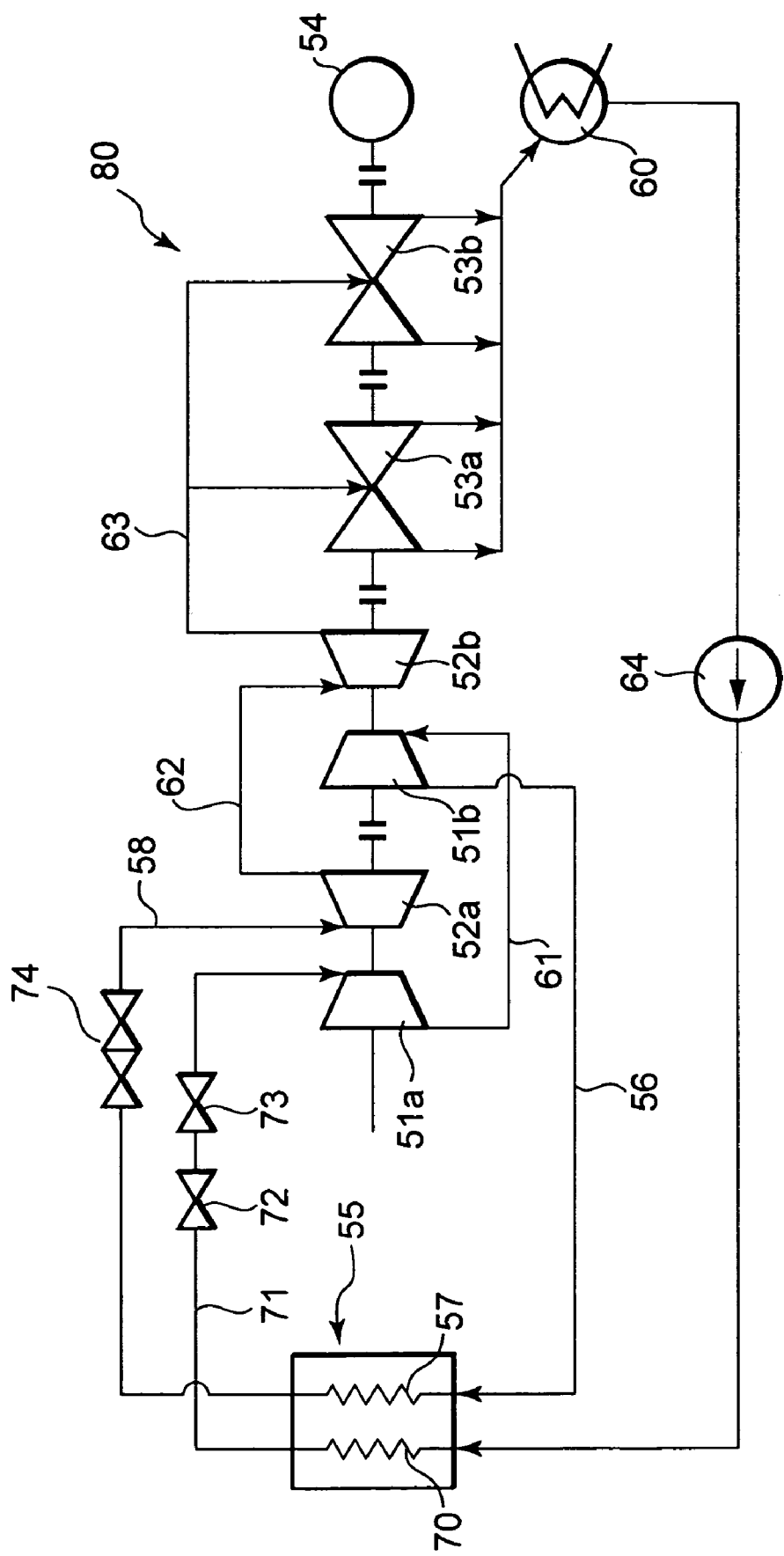
FIG. 6 is a flow diagram of an embodiment of a steam turbine plant according to the present invention.

The high temperature steam valves described above may be preferably applied to a steam turbine plant. For example, a typical steam turbine plant for electric power generation is shown in FIG. 6, which is similar to the plant disclosed in Japanese Patent Application Publication Hei 7-247806. Referring to FIG. 6, the steam turbine plant has a boiler 55, a series of steam turbines 80, a steam condenser 60 and a feed water pump 64.

The boiler generates steam, and the steam is sent to the series of turbines 80. The turbines 80 are connected with an electric power generator 54. The steam is condensed in the steam condenser 60 after it is used to rotate the turbines 80 and the generator 54. The condensed water is then fed to the boiler 55 by the feed water pump 64.

The series of steam turbines 80 includes a first high-pressure turbine 51a, a second high-pressure turbine 51b, a first mid-pressure turbine 52a, a second mid-pressure turbine 52b, a first low-pressure turbine 53a, and a second low-pressure turbine 53b. The boiler 55 includes a main boiler 70 and a reheater 57.

The main steam generated in the main boiler 70 is sent to the first high-pressure turbine 51a via a main steam line 71 with main steam valves 72 and 73. The steam is then sent to the second high-pressure turbine 51b via a high-pressure connecting line 61. The steam is then sent to the reheater 57 via a high-pressure return line 56.

The steam reheated in the reheater 57 is sent to the first mid-pressure turbine 52a via a reheated steam line 58 with a reheated steam valve 74 which is a composite type, for example. The steam is then sent to the second mid-pressure turbine 52b via a mid-pressure connecting line 62. The steam is then sent to the first and second low-pressure turbines 53a and 54b via a low-pressure steam line 63. The steam is then sent to the steam condenser 60.

The reheated steam valve 74 may be a composite-type reheat high temperature steam valve described as the first and second embodiments. Furthermore, the main steam valves 72 and/or 73 may be a main steam stop valve described as the third embodiment.

Numerous modifications and variation of the present invention are possible in light of the above teachings. It is, therefore, to be understood that, within the scope of the appended claims, the present invention can be practiced in a manner other than as specifically described herein.

What is claimed is:

1. A high temperature steam valve comprising:
a valve casing having a main steam inlet, a main steam outlet and a valve chest located therein;
a valve seat positioned in the valve chest;
a valve element facing the valve seat; and
a valve rod slidably penetrating the valve casing to drive the valve element, wherein a cooling steam passage is provided in such a manner as to surround a valve-rod penetrating portion of the valve casing, cooling steam being fed from outside into the cooling steam passage, and the cooling steam being exhausted toward the valve rod in the valve chest through the cooling steam passage, wherein the cooling steam passage comprises:

a cooling steam inlet hole for introducing the cooling steam from outside;

a cooling steam manifold communicating with the cooling steam inlet hole and formed so as to surround the valve-rod penetrating portion;

a plurality of cooling steam holes branching off from the cooling steam manifold and being formed in parallel with the valve-rod penetrating portion; and a cooling steam exhaust hole running off steam having passed the cooling steam holes into the valve chest.

2. The high temperature steam valve according to claim 1, further comprising a bush fit into the valve-rod penetrating portion of the valve casing to make the valve rod slide smoothly therein.

3. The high temperature steam valve according to claim 1, wherein the valve-rod penetrating portion is provided with a steam vent hole having an opening facing the valve rod, and piston rings for preventing steam leakage are positioned in front of and behind the openings of the steam vent hole.

4. The high temperature steam valve according to claim 2, wherein the bush has a slit splitting the bush in circumferential direction.

5. The high temperature steam valve according to claim 1, wherein a temperature of the main steam is not lower than 610 degrees Celsius and a temperature of the cooling steam is lower than 610 degrees Celsius.

6. A steam turbine plant comprising:

a steam turbine;

a boiler to feed steam to the steam turbine through a steam line;

a steam condenser to condensate steam from the turbine;

a feed water pump to feed water from the condenser to the boiler; and a high temperature steam valve disposed on the steam line, the valve including:

a valve casing having a main steam inlet, a main steam outlet and a valve chest located therein;

a valve seat positioned in the valve chest;

a valve element facing the valve seat; and a valve rod slidably penetrating the valve casing to drive the valve element, wherein a cooling steam passage is provided in such a manner as to surround a valve-rod penetrating portion of the valve casing, cooling steam being fed from outside into the cooling steam passage, and the cooling steam being exhausted toward the valve rod in the valve chest through the cooling steam passage, wherein the cooling steam passage comprises:

a cooling steam inlet hole for introducing the cooling steam from outside;

a cooling steam manifold communicating with the cooling steam inlet hole and formed so as to surround the valve-rod penetrating portion;

a plurality of cooling steam holes branching off from the cooling steam manifold and being formed in parallel with the valve-rod penetrating portion; and a cooling steam exhaust hole running off steam having passed the cooling steam holes into the valve chest.

\* \* \* \* \*